2,875,186

PROCESS FOR POLYMERIZING VINYL CHLORIDE IN THE PRESENCE OF METHYL CELLULOSE GELATIN AND INERT SOLVENT

James R. Gerhard II, West Lawn, and Claude C. Deegan and Thomas W. Fisher, Jr., Pottstown, Pa., assignors to The Firestone Tire & Rubber Company, Akron, Ohio, a corporation of Ohio No Drawing. Application December 9, 1954
Serial No. 474,278

2 Claims. (Cl. 260—92.8)

This invention relates to an improved suspension polymerization process for the production of vinyl chloride resins having excellent "dryness" characteristics, i. e., the resins produced rapidly imbibe large amounts of plasticizer and other liquid compounding ingredients without losing their characteristics as dry, free-flowing, granular materials.

The suspension polymerization process has come into wide use in the preparation of vinyl chloride resins, since, as compared to emulsion-produced resins, the resins produced in suspension are less contaminated by inorganic impurities, and have improved general working properties. Resins produced by the conventional suspension polymerization processes, however, have an undesirable "wet" characteristic—i. e., when they are blended in the usual dry-mixing machines with liquid plasticizers and other liquid compounding ingredients, these ingredients are not imbibed into the interior of the resin granules, but remain as an oily surface coating thereon. The resultant compositions are not free-flowing, which introduces considerable difficulty into the handling thereof. Moreover, the resins do not behave well in the hot-milling process to which they must be subjected at a later stage in the processing; the liquid ingredients lubricate the granules so that they are not subjected to a proper milling action. As a result, the milling process is unduly prolonged, and the milled compositions contain numerous unassimilated granules of resin which show up as "fish eyes" and other discontinuities in the finished products made therefrom.

Accordingly, it is an object of this invention to produce vinyl chloride resins having improved dryness characteristics.

Another object is to provide a novel suspension polymerization process for the production of vinyl chloride resins of improved dryness characteristics.

A further object is to provide such a process which may be carried out without undue alteration of existing equipment, and which will make full utilization of such equipment.

SYNOPSIS OF THE INVENTION

The above and other objects are secured, in accordance with this invention, in a process in which vinyl chloride, or a mixture thereof with minor proportions of other unsaturated compound or compounds copolymerizable therewith, is polymerized in suspension in an aqueous medium containing dissolved therein, as a suspending agent, a mixture of gelatin plus methyl cellulose, the combination being used in substantially less than the proportions in which either one of these two agents would be required alone in the polymerization mass. In general, the total weight of the mixture of gelatin and methyl cellulose constitutes about 0.08 to 0.18% of the weight of the aqueous medium, and the ratio of weight of the gelatin to that of the methyl cellulose may vary from 3:1 to 1:3.

THE VINYL CHLORIDE AND COMONOMERS UTILIZABLE THEREWITH

As noted hereinabove, the process of this invention is applied to the polymerization of vinyl chloride, either alone or in admixture with minor proportions of other ethylenically unsaturated compounds copolymerizable therewith. The amount of any such comonomers used is sufficiently small, say up to 20% based on the total weight of vinyl chloride plus such comonomers, that the resultant polymeric product consists essentially of polyvinyl chloride chains having occasional interspersed units derived from the comonomers, these units being insufficient in number to radically change the essentially polyvinyl chloride character of the chains. Suitable unsaturated compounds for copolymerization with vinyl chloride include for instance, vinylidene chloride, vinylidene bromide, vinylidene fluorochloride, and the like; unsaturated hydrocarbons such as ethylene, propylene, isobutene and the like; allyl compounds such as allyl acetate, allyl chloride, allyl ethyl ether and the like; and conjugated and cross-conjugated ethylenically unsaturated compounds such as butadiene, isoprene, chloroprene, 2,3-dimethylbutadiene-1,3, piperylene, divinyl ketone and the like. For a fairly complete list of materials known to polymerize with vinyl chloride, reference may be had to Krczil, "Kurzes Handbuch der Polymerisations-Technik—II, Mehrstoff Polymerisation," Edwards Bros. Inc., 1945, pp. 735–747, the items under "Vinyl Chlorid." As a rough rule, the criterion of a practical comonomer for use with vinyl chloride to produce copolymers containing 80% or more of vinyl chloride, is that (on a mole percentage basis) an initial charge of 96% vinyl chloride, balance comonomer, shall yield an initial copolymer containing (a) at least 90% vinyl chloride and (b) not more than 99% vinyl chloride. On this basis, satisfactory comonomers for use with vinyl chloride will be those having "$Q_2$" and "$e_2$" values, as described in J. Polymer Science 2:101, correlated as follows, assuming for vinyl chloride $Q_{\text{vinyl chloride}} = .03$ and $e_{\text{vinyl chloride}} = .3$ $$4.1 > \frac{\frac{.029_e^{-.3(.3-e_2)}}{Q_2} + .04}{1.33 Q_2 e^{e_2(.3-e_2)} + .96} > .37$$

Instead of the single unsaturated comonomers of the type above indicated, mixtures of such comonomers may enter into the copolymers, it being understood that the total quantity thereof shall be small enough (i. e., not over 20% based on the weight of the copolymer) that the essential character of the polyvinyl chloride chain is retained.

THE SUSPENSION POLYMERIZATION PROCESS

The suspension polymerization process in connection with which this invention is practiced comprises agitating and dispersing the vinyl chloride and any comonomers in an aqueous medium, containing dissolved therein both (A) gelatin and (B) methyl cellulose. The ratio of the weight of gelatin to that of methyl cellulose may vary from about 3:1 to 1:3. The total sum of the weight of the gelatin plus the weight of the methyl cellulose required varies considerably, depending upon the geometry of the polymerization apparatus and rate of agitation. In general, with a given apparatus and rate of agitation, the mixture in accordance with this invention is used in substantially less proportions than the proportions in which either one of these materials would have to be used alone. For practical commercial operations, in which reactors of 50 or more gallons are used, and agitation intensities, on the Pfaudler scale, of 5.0 to 15.0 prevail, the total weight of the mixture of gelatin and methyl cellulose employed in this invention, will range from 0.08 to 0.18%, based on the weight of the aqueous medium. By way of comparison, using the commercial equipment and conditions noted above, a minimum of 0.25 percent of either gelatin or methyl cellulose would have to be used to secure adequate dispersing action. In the suspension polymerizations of this invention, the monomeric constituents of the charge constitute from 10 to 60% of the total weight of monomers plus aqueous medium. The polymerization initiator employed is of a type soluble in the vinyl chloride phase, typical initiators of this sort being acyl peroxides and hydroperoxides such as benzoyl peroxide, acetyl peroxide, lauryl peroxide, caproyl peroxide, peracetic acid, perbenzoic acid and the like; the hydrocarbon peroxides and hydroperoxides such as 2-butyl hydroperoxide, cumene hydroperoxide, ascaridole and the like. The initiator system in some cases also includes a redox complex, including usually an oxidizing agent (commonly supplied by the peroxide initiator), a versivalent metal compound (e. g., an iron compound) and a reducing agent (e. g., sodium bisulfite, a reducing sugar or the like). The polymerization is conducted with sufficient agitation to ensure the dispersal of the monomer as droplets in the aqueous phase, and to ensure the persistence of the droplets throughout the reaction. The polymerization is usually carried out at temperatures in the range of 45° to 100° C. which range may be broadened to 0° to 100° C. where active catalyst systems (such as those involving redox combinations) are employed. The polymerization is continued until at least about 75% of the monomers have become polymerized, at which time polymerization conditions are discontinued, and the inert solvents and any unreacted monomers are vented.

SUPPLEMENTARY POROSITY-ENHANCING TECHNIQUES

The technique of using the combined gelatin plus methyl cellulose suspending agents in accordance with this invention for the production of plasticizer-absorptive resins may be used in combination with other techniques directed to the same end, providing, of course, these other techniques are not inconsistent with the technique of this invention. For instance, under any conventional system of suspension polymerization, the absorptivity of the resin product can be greatly enhanced by stopping the polymerization reaction before it has proceeded to completion: this technique may be practiced concurrently with the practice of this invention and will result in a resin having enhanced porosity over the resin obtained in accordance with either technique practiced alone. A particularly useful technique, which the present applicants have practiced in connection with the use of mixed gelatin-methyl cellulose suspending agents, consists in the addition of a small amount of an inert solvent to the monomers to be polymerized. This technique appears to cooperate in a particularly favorable manner with the mixed gelatin-methyl cellulose suspending agents, and yields resins having absorptive properties far better than might be expected from experience with either of the techniques practiced alone. In general, these particularly superior results will be achieved if the polymerization charge includes from 0.5 to 25%, based on the weight of vinyl chloride, of an inert solvent for the vinyl chloride. Most conveniently, this solvent is mixed with the vinyl chloride before charging, or is otherwise incorporated into the original polymerization charge. However, the disadvantageous occurrences tending to result in wet resin in suspension polymerization processes appear to take place chiefly in the later stages of the polymerization reaction; the advantage of this supplemental technique is therefore secured in processes according to this invention in which the solvent is added before these later stages, say before more than about 50% of the monomers have undergone polymerization.

Suitable inert solvents for incorporation with the polymerization mixtures in accordance with this invention include any organic solvents for vinyl chloride which do not solvate or swell polyvinyl chloride, and which are not polymerizable and are not sufficiently reactive with free radicals to adversely affect the polymerization reaction. Likewise, the solvent must have a sufficient vapor pressure, say at least 50 mm. at 40° C., in order that it may be stripped at the close of the polymerization reaction. Such solvents include, for instance, benzene, toluene, butane, pentane, hexane, heptane, petroleum ether, naphtha, ethylene dichloride and the like.

With the foregoing general discussion in mind, there are given herewith detailed specific examples of the practice of this invention. All parts given are by weight.

Example I

USE OF COMBINATION OF GELATIN PLUS METHYL CELLULOSE WITHOUT SOLVENT

| | Parts |
|---|---|
| Water | 200 |
| Vinyl chloride | 100 |
| Methyl cellulose | 0.15 |
| Gelatin | 0.15 |
| Lauroyl peroxide | 0.40 |

The above ingredients were charged into a pressure vessel and agitated together for 24 hours at 50° C. At the end of this time, the reaction was cooled to 25° C., the unreacted monomer vented, and the residual slurry of granular polyvinyl chloride discharged, dewatered on a filter, washed on the filter and dried. The resultant resin had excellent dryness properties: for instance, after tumbler-mixing with half its weight of dioctyl phthalate, the product could be stored in kraft paper sacks without bleeding of the dioctyl phthalate into the paper of the sacks.

Example II

USE OF SOLVENT

| | | |
|---|---|---|
| Water | pounds | 220 |
| Vinyl chloride | do | 110 |
| Methyl cellulose (15 centipoise grade) | grams | 75 |
| Gelatin (100 bloom grade) | do | 75 |
| Lauroyl peroxide | do | 200 |
| Toluene | do | 270 |

The above ingredients were charged into a 50-gallon reactor provided with an anchor stirrer, and a heating and cooling jacket. The free space was purged with nitrogen, the vessel sealed, agitation commenced at the rate of 180 R. P. M. and the temperature adjusted to 122° F. These conditions were maintained for 24 hours, at the end of which time 91% of the monomeric vinyl chloride had become polymerized. At that time, the unreacted vinyl chloride and toluene were vented, the temperature lowered, and the charge dropped, dewatered on a filter, washed on the filter, and dried. The resultant granular resin had excellent absorptivity for liquid plasticizers.

From the foregoing general description and detailed specific examples, it will be evident that this invention provides a novel and highly effective method for the production of vinyl chloride resins having excellent absorptivity for liquid plasticizers. No unusual or expensive reagents are required, and the process may be carried out with a minimum of skilled attendance.

What is claimed is:

1. Process which comprises polymerizing vinyl chloride in suspension in an aqueous medium, and in the presence of from 0.5 to 25%, based on the weight of the vinyl chloride, of an inert solvent for vinyl chloride selected from the group consisting of benzene, toluene, butane, pentane, hexane, heptane, petroleum ether, naphtha, and ethylene dichloride, said aqueous medium having dissolved therein both gelatin and methyl cellulose, the total weight of said dissolved methyl cellulose and gelatin being from 0.08 to 0.18% of the weight of said aqueous medium, and the ratio of the weight of said gelatin to the weight of said methyl cellulose being from 3:1 to 1:3.

2. Process which comprises polymerizing vinyl chloride in suspension in an aqueous medium in the presence of from 0.5 to 25%, based on the weight of the vinyl chloride, of an inert solvent for vinyl chloride selected from the group consisting of benzene, toluene, butane, pentane, hexane, heptane, petroleum ether, naphtha, and ethylene dichloride, said aqueous medium having dissolved therein both gelatin and methyl cellulose, said gelatin and methyl cellulose being present in substantially equal proportions, and the total weight of said gelatin and methyl cellulose being from 0.08 to 0.18% of the weight of said aqueous medium.

References Cited in the file of this patent
UNITED STATES PATENTS

| | | |
|---|---|---|
| 2,194,354 | Crawford et al. | Mar. 19, 1940 |
| 2,528,469 | Condo et al. | Oct. 31, 1950 |
| 2,787,610 | Janssen | Apr. 2, 1957 |

OTHER REFERENCES

D'Alelio: "Fundamental Principles of Polymerization," published by John Wiley & Sons, New York, 1952, pages 357–360.